United States Patent
Alekna

[15] 3,666,830
[45] May 30, 1972

[54] LEAD COMPOUND CATALYZED SILOXANE RESIN SYSTEM

[72] Inventor: Alvin J. Alekna, Scotia, N.Y.

[73] Assignee: General Electric Company

[22] Filed: Jan. 21, 1971

[21] Appl. No.: 108,652

Related U.S. Application Data

[63] Continuation of Ser. No. 782,470, Dec. 9, 1968, abandoned.

[52] U.S. Cl. ............................260/825, 252/428, 252/430, 260/18 S, 260/29.1 B, 260/37 SB, 260/46.5 R, 260/46.5 E
[51] Int. Cl. ................C08g 47/04, C08g 47/10, C08g 31/32
[58] Field of Search .........................260/825, 46.5

[56] References Cited

UNITED STATES PATENTS

| | | | |
|---|---|---|---|
| 2,516,047 | 7/1950 | De Coste | 260/46.5 |
| 2,855,378 | 10/1958 | Braley | 260/46.5 |
| 3,208,961 | 9/1965 | Kookootsedes | 260/46.5 |
| 3,264,260 | 8/1966 | Muller et al. | 260/46.5 |

*Primary Examiner*—Samuel H. Blech
*Attorney*—E. Philip Koltos

[57] ABSTRACT

A molding compound contains an uncured siloxane resin, a lead containing catalyst, and a silane or polysiloxane containing an appreciable amount of silanol or alkoxy groups. The molding compound is relatively stable at flow temperatures but cures rapidly at molding temperatures. The molding compound is used in the transfer molding of transistor housings.

6 Claims, No Drawings

LEAD COMPOUND CATALYZED SILOXANE RESIN SYSTEM

This application is a continuation of application Ser. No. 782,470, filed Dec. 9, 1968, now abandoned.

This invention relates to improved catalyzed silicone resin molding compounds.

In preparing silicone resin molding compounds, one needs to blend silicone resin, catalyst, and, if desired, filler. Since silicone resins are generally hard and brittle at room temperature, it is necessary to heat the resin while the filler and catalyst are being mixed therewith in order to soften the resin sufficiently to permit uniform blending. A problem, however, arises in that heating the resin in the presence of the curing catalyst during mixing causes the resin to cure, as these resin systems are thermosetting. When such a heated catalyzed resin system is used in a transfer molding operation, the hot fluid catalyzed resin must be fluid enough to pass through the small transfer molding channel to the mold without setting in the channel, through the mold cavity without setting before the cavity is completely filled, and then cured shortly thereafter in order that the molding process be rapid.

The main object of the invention is to create a new silicone resin catalyst system which permits a silicone resin molding compound to be heated until it is fluid without danger of curing, but provides a fast cure of the resin system at a temperature slightly above the flow temperature of the resin but below a temperature which would degrade the physical properties of the cured resin.

The catalyst system which is used in the present invention is catalytically active at high temperature but is relatively inactive at low temperature. Apparently, what happens is that the catalyst employed complexes with silanol groups of the resin or with an added silanol containing silicone at higher temperatures and the complex formed is soluble in the resin. The soluble complex is active at high temperatures but is non-existent at low temperatures and the uncomplexed physical admixture is relatively inactive.

The thermosetting silicone resin molding compounds of this invention comprise an intimate mixture of (a) an uncured silicone resin containing at least 0.25 percent by weight of silicon-bonded hydroxyl groups or lower alkoxy groups having one to eight carbon atoms per group, and a catalytic amount of (b) a composition consisting of from one-half to 10 percent and preferably from 1 to 4 percent by weight based upon the total weight of (a) + (b) of a silane or siloxane containing silanol groups or alkoxy groups, and from 0.01 to 5 percent by weight of a compound selected from the group consisting of $2PbCO_3$, $PbCO_3$, $Pb_2O_3$, $Pb_3O_4$, and $PbO_2$. When the siloxane resins contain more than 4 percent by weight of silicon-bonded hydroxyl groups, the silane or siloxane containing silanol or alkoxy groups is no longer required, but is still preferred. It is preferred for ingredient (b) to contain from 1 to 4 percent of the silane or siloxane compound and from 0.1 to 0.6 percent of the lead compound. Any silane or low molecular weight polysiloxane fluid containing alkoxy or silanol groups is a suitable ingredient for component (b).

Generally speaking, silanes which can be employed as an ingredient for component (b) in the practice of the present invention are those falling within the scope of the formula $R_t(OH)_u(OR)_vSi$ where R is selected from the class comprising lower alkyl radicals having one to eight carbon atoms; cycloalkyl radicals having five to seven carbon atoms in the ring; lower alkenyl radicals having two to eight carbon atoms; mononuclear aryl radicals; mononuclear aryl lower alkyl radicals having one to six carbon atoms in the alkyl group; and halogenated derivatives of the above radicals; OR is a lower alkoxy radical containing from one to eight carbon atoms per radical; $t$ has a value of 1 to 3; $u$ has a value of 0 to 3; $v$ has a value of 0 to 3; and the sum of $u + v$ has a value of 1 to 3.

Generally speaking, siloxane compounds which can be employed as an ingredient for component (b) in the practice of the present invention are those falling within the scope of the formula $R^2_x(HO)_y(OR)^2_zSiO_{(4-x-y-z)/2}$, where $R^2$ and $(OR)^2$ are defined as R and (OR) respectively are defined above; $x$ has a value of 1 to 3; $y$ has a value of 0 to 2, $z$ has a value of 0 to 2, and the sum of $y + z$ has a value of 0.02 to 2. When $x$ has a value of less than 1.7, there must be at least 5 percent by weight of HO and $(OR)^2$ groups in the siloxane compound. It is preferable that $z$ have a value of 0. Examples of polysiloxanes which can be used are:

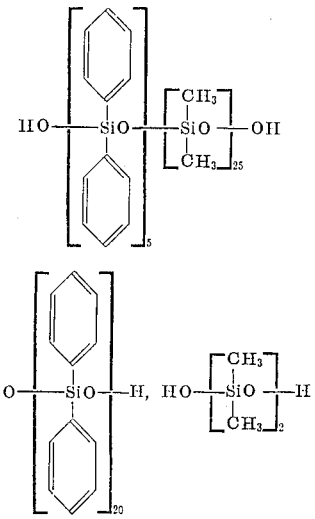

The choice of which silicon containing materials to use in ingredient (b) depends in part on the length of storage, i.e., a more volatile material will be lost to a greater degree on storage than a less volatile material, on the degree of plasticity desired in the final cast resin, and the silanol content of the casting resin, i.e., if the silanol content of the resin is relatively high, the silanol or alkoxy content of the polysiloxane of component (b) can be relatively low, and in fact if the silanol content of the casting resin is over 4 percent by weight, the silanol containing polysiloxane of component (b) is not required as part of the catalyst system. It is preferred, however, to use a silanol containing polysiloxane fluid in combination with casting resins having a silanol content of over 4 percent as they act as plasticizers.

The siloxane resins that can be used in the composition of this invention are well known materials. By the term "siloxane resin," is it meant polymers containing two or more siloxane units, and having the average unit formula

where $R^3$ is selected from the same class as R; $(OR)^3$ is selected from the same class as (OR); $s$ has a value of 1.0 to 1.7 and preferably has a value of 1.05 to 1.45; $q$ has a value of 0 to 1.0 and preferably a value of 0.2 to 0.55; $r$ has a value of 0 to 1.0 and preferably has a value of 0.2 to 0.55 and the sum of $q + r$ has a value of 0.01 to 1.0 and preferably has a value of 0.2 to 0.55.

Examples of siloxane units that can be present in the siloxane resins are

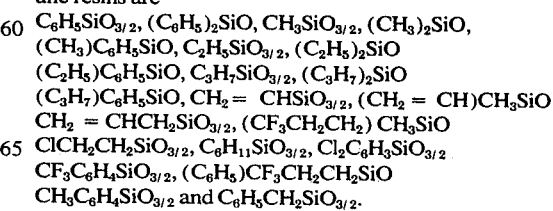

More specifically, R, $R^2$ and $R^3$ are selected from the class consisting of lower alkyl radicals, e.g., methyl, ethyl, propyl, butyl, and octyl radicals; cycloalkyl radicals having five to seven carbon atoms in the ring, e.g., cyclopentyl, cyclohexyl, and cycloheptyl radicals; lower alkenyl radicals, e.g., vinyl and allyl radicals; mononuclear aryl, e.g., phenyl, tolyl and xylyl; mononuclear aryl lower alkyl radicals, e.g., benzyl and phenylethyl radicals; and halogenated derivatives of the above radicals, e.g., chloromethyl, beta-chloroethyl, chlorophenyl, dibromophenyl and trifluoromethylethyl radicals. Preferably, R, $R^2$ and $R^3$ are selected from the class consisting of methyl, ethyl and phenyl.

The lower alkoxy radicals, OR, $(OR)^2$ and $(OR)^3$ are selected from the class consisting of lower alkoxy radicals having one to eight carbon atoms, e.g., methoxy, ethoxy, propoxy and isopropoxy radicals and is preferably selected from the class consisting of the above specifically named radicals.

The ratio of the organic substituents to the silicon atoms in the above-described siloxane resin must be in the range of 1.0:1 to 1.7:1. Preferably, the resin has a phenyl to silicon ratio of 0.5:1 to 0.7:1, and other substituents to silicon ratio of 0.5:1 to 0.1:1, and a total phenyl and other substituents to silicon ratio of 1.05:1 to 1.45:1. The preferred resins of this invention are the phenylmethylsiloxane resins, i.e., resins containing siloxane units containing phenyl groups, and siloxane units containing methyl groups. The preferred resin contains some siloxane units having two monovalent hydrocarbon substituents per siloxane unit as this adds flexibility to the cured resin. Preferably, from 5 to 45 percent of the siloxane units contain two monovalent hydrocarbon substituents per siloxane unit.

In addition, the resin must contain at least 0.25 percent by weight of silicon-bonded OH and/or $(OR)^3$ groups. The resin can contain a much higher percentage of OH groups and preferably contains at least 5 weight percent of OH groups. At least 4 weight percent of OH groups and $(OR)^3$ groups is a critical requirement if the lead containing catalyst is to be used in the absence of the aforedescribed silane or siloxane fluid of component (b). It is preferable that 90 percent of the total OH and $(OR)^3$ groups be OH groups. The $(OR)^3$ groups are lower alkoxy groups having up to eight carbon atoms, such as methoxy, ethoxy and isopropoxy groups. The presence of such groups on methylsiloxy groups in the resin aids in regulating the cure time of the resin. As the ratio of alkoxy groups to siloxy groups increases the cure time increases.

If desired, fillers and pigments can be added to the uncured resin to increase the strength of the cured resin, reduce crazing, make a more attractive product, etc. The particular pigment or filler employed in the composition of this invention is not critical but fillers which have a catalytic effect in themselves toward the resin of this invention should be avoided. Alkaline fillers in large quantities and strongly acidic fillers should be particularly avoided as should other fillers which exert a catalytic effect on the condensation of the silicone resin. Some inert fillers which are suitable are ground glass, diatomaceous earth, crushed quartz, fume silica, precipitated silica, magnesium silicate, zirconium silicate, and aluminum silicate. The preferred filler are zirconium silicate, chopped glass fibers, aluminum oxide and fused silica. The amount of filler present in the resin can vary from 0 percent up to the point where the filler concentration is so high that it interferes with the flow properties of the molding resin. This point is, of course, a function of the type of resin, the type and amount of plasticizer present, and the porosity of the filler.

Silicone resins which may be used in the practice of the present invention, generally speaking, are well known in the art. For example, see U.S. Pat. No. 2,646,441 of Duane, U.S. Pat. No. 3,135,713 of Brewer et al., and U.S. Pat. No. 3,389,114 of Burzynski et al. and the discussion therein.

The preferred resins for use in the practice of the present invention are those having a silanol (measured as OH) content of 5 to 7 percent by weight. The method of making such resins is generally set forth in U.S. Pat. application, Ser. No. 671,574 of Duane F. Merrill, filed Sept. 29, 1967, now abandoned, entitled Silanol-Containing Organopolysiloxane Resins and a Method for Making Them. In addition, the preferred resins also contain some siloxy groups which are substituted with one methyl radical per siloxy unit and these mono-substituted siloxy units also contain some alkoxy substitution. It is the siloxy units in the resin which are mono-substituted with methyl groups and which also contain some alkoxy substitu-tion which regulate the cure time of the resin. If the resin contains over 5 percent silanol by weight and contains no alkoxy groups, the cure time of the resin at high temperatures can be so fast that it would be impractical to use such resin in transfer or injection molding operations.

Silanol-containing organopolysiloxane resins having a silanol content of 5 percent to 11 or 12 percent can be made by hydrolyzing organohalosilanes utilizing a water immiscible organic solvent and acetone as a cosolvent. The method involves agitating a mixture comprising (A) organohalosilane preferably in combination with a lower alkyltrialkoxysilane, (B) water, (C) acetone, (D) a water immiscible organic solvent, and (E) an aliphatic monohydric alcohol having from one to eight carbon atoms where there is present by weight in said mixture, per part by weight of (A), 1.7 to 10 parts of (B),
0.2 to 5 parts of (C), and
0.3 to 5 parts of (D), and from 0 to 1 mole of (E) per mole of halogen attached to silicon of (A), (2) separating an organic solvent solution of (F) from the resulting hydrolysis mixture of (1), where (F) is a silanol-containing organopolysiloxane having an average ratio of from about 1 to 1.8 organo radicals per silicon atom, and (A) is selected from, a. organotrihalosilane,
b. a mixture of organotrihalosilane and diorganodihalosilane,
c. the reaction product of (E) and a member selected from (a) and (b), which has an average ratio of up to 1 alkoxy radical per halogen radical,
d. a mixture of (c) and a member selected from (a) or (b), and where the organo radicals of (A) and (F) are attached to silicon by carbon-silicon linkages and are selected from monovalent hydrocarbon radicals, halogenated monovalent hydrocarbon radicals, and cyanoalkyl radicals.

Included by the organohalosilanes which can be employed in the practice of the invention, are silanes of the formula, $$(R^4)_a SiX_{4-a}, \qquad (1)$$

where $R^4$ is selected from the same class as R, X is a halogen radical, such as chloro, and $a$ is an integer having a value of 1 or 2. In addition, there can be employed in combination with such organohalosilanes of formula (1), an aliphatic monohydric alcohol of the formula, $$R'OH, \qquad (2)$$

or an alkoxylated organosilane of the formula, $$(R^5)_a(R'O)_b SiX_{4-a-b}, \qquad (3)$$

where $R^5$ is selected from the same class as R; X and $a$ are as defined above; $b$ is an integer equal to 1 to 3, inclusive; and the sum of $a$ and $b$ is equal to 2 to 4, inclusive.

Included by the organohalosilanes of formula (1) are for example, methyltrichlorosilane, dimethyldichlorosilane, methylphenyldichlorosilane, phenyltrichlorosilane, diphenyldichlorosilane, etc. Included by the partially alkoxylated organohalosilanes of formula (3), are reaction products of organohalosilanes of formula (1), where $R^4$ is preferably selected from the class consisting of monovalent hydrocarbon radicals and halogenated monovalent hydrocarbon radicals, with alcohols of formula (2) such as methyl alcohol, ethyl alcohol, propyl alcohol, isopropyl alcohol, butyl alcohol, etc.

In instances where the aliphatic monohydric alcohol of formula (2) is utilized in the practice of the invention, the alcohol can be added directly to the organohalosilane of formula (1) before hydrolysis, or it can be added to the hydrolysis mixture prior to the addition of the organosilane. As a result, the silanol-containing organopolysiloxane of the present invention, can be free of, or contain chemically combined alkoxy radicals attached to silicon.

The preferred uncured silicone resins of the present invention can have from 4 to 11 percent and preferably from 5 to 7 percent by weight of hydroxy radicals attached to silicon. These resins are friable fast curing molding materials when at 100 percent solids. Experience has shown that in most instances, the average ratio of the $R^4$ radicals to silicon will determine the nature of the resin and its utility. For example, resins at 100 percent solids, having an average ratio of about 1 to about 1.2 $R^4$ radicals per silicon atom, a silanol content of from 4 to 11 percent by weight, with or without chemically combined alkoxy radicals, are generally friable, and suitable for molding applications. These moldable materials have been found to soften at temperatures as low as 60° C, and generally flow at temperatures between 70°–90° C.

In accordance with the method of the invention, hydrolysis is achieved by agitating the organohalosilane in the presence of water, acetone, and organic solvent. The organic layer is separated from the acid layer which forms during hydrolysis. The organic phase then is stripped to produce a 100 percent solids resin.

Although the order of addition of the various ingredients is not critical, it is preferred to add the organohalosilane to the mixture of water, acetone, and organic solvent. Preferably, a proportion of from 2 to 6 parts of water, 0.3 to 2 parts of acetone, and 0.6 to 2 parts of organic solvent, per part of organohalosilane can be employed. Suitable organic solvents are for example, any water immiscible organic solvent which is inert to the hydrolysis reactants during hydrolysis, and in which the hydrolyzate is soluble, to provide for its separation from the aqueous layer. For example, there can be employed a hydrocarbon such as benzene, toluene, xylene, etc., esters such as butyl acetate and ethyl acetate; ethers such as diethyl ether, dioxane, etc. During the addition, the mixture is agitated to provide for a sufficient degree of hydrolysis of the organohalosilane and formation of the organopolysiloxane hydrolyzate. The temperature of the hydrolysis mixture can be controlled by the rate of addition, or external heat or cooling can be employed if desired. During hydrolysis, a temperature between 0° to 80° C has been found effective, while a temperature between 20° to 40° C is preferred. After the addition has been completed, the mixture can be stirred for an additional period of time, such as 30 minutes or more to allow for complete hydrolysis of the organohalosilanes. The mixture is then allowed to settle and the acid layer can be drawn off from the organic layer. The organic layer can then be stripped of solvent to 100 percent solids.

When making molding resins, it has been found expedient to strip under reduced pressure, such as a pressure between 25 mm to 500 mm Hg. to a solids concentration of from 50 to 70 percent by weight of the resin solution. Resin impurities can be removed at this solids concentration, such as by filtration, centrifuging, etc. Further stripping can be employed to 100 percent solids at a temperature sufficient to remove all of the residual solvent. For example, when stripping toluene, a temperature up to 130° C has been found effective.

In instances where the average $R^4$ to Si ratio is above 1.2, for example, 1.2 to 1.4 or 1.4 to 1.8, it is preferred to strip at atmospheric pressure to a solids concentration of up to about 95 percent. If it is desired, the resin can be refluxed 2 to 3 hours at temperatures between 190° to 230° C, to further improve the characteristics of the resin.

The procedure generally followed in making the molding compounds of the present invention generally involves the following steps:

1. The materials which are to be added to the resin are blended together, e.g., fillers such as glass fibers mixed with silica filler and a release agent such as calcium stearate, along with color pigments and a catalyst such as lead carbonate in a high speed blade mixer at a speed on the order of 4,000 rpm for approximately 4 minutes. After the ingredients are thoroughly mixed, the silicone resin is added to the mixer and is mixed in with the other components at a speed of about 2,000 rpm for approximately 2 minutes. The molding compound is then made by transferring the blend from the mixer into a double screw conveyor which feeds a rotor mixer. A temperature on the order of 80° to 100° C is employed and a rotor speed in the neighborhood of 500 ± 100 rpm is employed.

2. A catalyst complexing agent such as a silanol end-stopped polysiloxane containing both dimethylsiloxy and diphenylsiloxy units is then pumped into the mixture in the rotor chamber. The output of the rotor mixer which has been fluidized by the heat generated in the mixer is fed between two rollers where it is formed into a solid sheet. The sheet is cooled to room temperature and granulated in a grinder to a particle size of approximately 10 mesh. This 10 mesh particle size molding compound can be used, as is in an injection, transfer or compression molding apparatus or can be pelletized before use in such molding apparatus.

The following examples are illustrative of the practice of my invention.

EXAMPLE 1

This example describes the manufacture of a molding resin and the use of the molding resin in a transfer molding operation to make a transistor housing.

A silane blend composed of 19.5 moles of methyltriethoxysilane, 28.5 moles of methyltrichlorosilane, 47 moles of phenyltrichlorosilane, and 5 moles of dimethyldichlorosilane was hydrolyzed in a mixture of toluene, acetone and water. For every thousand parts of the silane blend, there was 4,547 parts of the toluene-acetone-water mixture. The mixture was composed of 825 parts of toluene, 722 parts of acetone and 3,000 parts of water.

The hydrolysis was carried out by adding the silane blend to a preheated mixture of the toluene, acetone and water. The silane blend was added over a 25-minute period, during which time the temperature of the hydrolysis mixture went from 25° to 70° C. After the silane addition had been completed, the hydrolyzate was agitated for 5 minutes. The agitation was stopped and layers separated very rapidly. As soon as the separation was completed, the resin was transferred into a bodying kettle and vacuum stripped at 40° C to a solids content of 50 percent.

The resin which has been formed by the aforedescribed hydrolysis process was then vacuum dried using a continuous film evaporator. When all of the solvent had been removed, the resin was then cast, cooled to room temperature, and ground to a fine powder. The resin should not be exposed to any appreciable amount of atmospheric moisture as it picks up water which causes gassing when the resin is used in a molding operation. It is also necessary to perform the entire hydrolysis, drying and grinding operation in equipment which does not add any catalytic metal, especially iron, to the high silanol resin. In the present example, as much of the equipment as was possible was glass-lined.

A molding compound was made by adding to a high speed blade mixer, 17.3 parts of chopped glass fibers, 17.3 parts of silica filler, 0.47 part of calcium stearate, and 0.7 part of lead carbonate. The components are mixed in a high speed blade mixer at a blade speed of 40,000 rpm for 4 minutes. After the ingredients are thoroughly mixed, 15.4 parts of the above-described resin is added to the mixture and is mixed in with the other components at a speed of 20,000 rpm for 2 minutes. The blend which is formed is then transferred from the mixture into a double screw conveyor which feeds a rotor mixer. A screw chamber temperature of 90° C and a rotor speed of 500 rpm is applied. Into the mixture in the rotor chamber is then pumped 0.67 part of a fluid of the formula

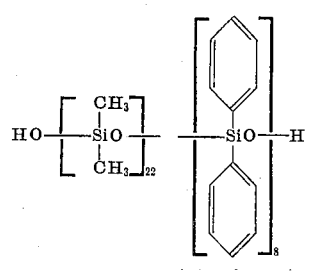

(the dimethyl and the diphenylsiloxy units are in random rather than block arrangement). The output of the rotor mixer which had been fluidized by the heat generated in the mixer was then fed between two rollers where it was formed into a solid sheet. The sheet was cooled to room temperature and granulated in a grinder to a particle size of approximately 10 mesh. The molding compound which was formed by the above method was then used in a transfer molding apparatus to form transistor bodies. This involved heating the molding compound to 150° C, transferring the molten molding compound through the channels of a molding apparatus and into a mold cavity which had been heated to 175° C. The resin was allowed to cure in the mold cavity for 2 minutes. The transistor casing which had been formed was then removed and found to be perfectly formed having no voids or blow holes. The transistor was then baked for 2 hours at 200° C to eliminate any traces of moisture or gases which had been formed during the molding operation. The transistor was then used in an electronic circuit and found to have excellent electrical properties.

EXAMPLE 2

Following the method generally described in U.S. Pat. No. 3,389,114 of Burzynski, a methylpolysiloxane resin was prepared. The resin had a methyl to silicon ratio of one methyl radical per silicon atom, 6 percent by weight of silicon-bonded alkoxy groups, and 1 percent by weight of silicon-bonded hydroxyl groups.

Into a high speed blade mixer was added 40 parts of the resin, 60 parts of one-eighth inch Owens Corning hammer milled Fiberglas, 60 parts of 325 mesh fused silica, 1 part of calcium stearate, 0.2 parts of lead carbonate and 1 part of diphenylsilanediol. All of the above ingredients were blended together in the high speed blade mixer until the mixture was homogeneous. The composition was then milled on a two-roll mill at a temperature of 100° C for 5 minutes, the resulting composition was cooled to 25° C and granulated. The composition was then molded for 3 minutes at 175° C and 1,000 psi to produce a 6 × 6 × 1/16 inch test specimen. The molded sample, when removed from the hot mold was rigid, unblistered and free of any voids. The sample had the following properties:

| | | |
|---|---|---|
| Flexural Strength (ASTM D790) | 9200 psi | |
| Tensile Strength (ASTM E638) | 4600 psi | |
| Dissipation Factor $10^6$ Hz (ASTM D150) | | |
| | As Received | 0.001 |
| | After 24 hours in water at 25° C. | 0.002 |

Example 2 was repeated except that the 1 part of diphenylsilanediol was replaced with 1 part of resorcinol. The test specimens produced were very badly blistered and had many voids. The test specimens produced had the following properties:

| | | |
|---|---|---|
| Flexural Strength | 5200 psi | |
| Tensile Strength | 2100 psi | |
| Dissipation Factor — | As received | 0.001 |
| | After 24 hours in water at 25° C. | 0.01 |

The molding compound produced using the diphenylsilanediol was used in transfer molding of transistor housings. This involved casting a housing around a transistor junction resulting in the embedding of the transistor junction within the housing. After molding, the transistor housings were subjected to a heat treatment of 200° C for 2 hours to completely remove any entrapped alcohol, water or gases. The transistors produced were of uniform quality and had excellent electrical properties.

EXAMPLE 3

According to the general method described in Merrill patent application, Ser. No. 671,574, filed Sept. 29, 1967, now abandoned, a phenylpolysiloxane resin was prepared. The resin contained 7.0 percent by weight of silicon-bonded hydroxyl groups, and had a ratio of phenyl radicals to silicon atoms of 1.0.

A molding compound was formulated by first mixing 40 parts of the resin, 60 parts of one-eighth inch Owens Corning hammer milled Fiberglas, 60 parts of 325 mesh fused silica, 1 part of calcium stearate, 0.2 part of lead carbonate, and 1 part of diphenylsilanediol. All of the above ingredients were blended together in a high speed blade mixer and then milled on a two-roll mill at a temperature of 90° C for 5 minutes. The resulting composition was cooled to 25° C and granulated. The molding compound produced was then molded for 3 minutes at 175° C at 800 psi to produce a 6 × 6 × 1/16 inch test specimen. The test specimen was rigid, unblistered and free of voids, and had the following properties:

| | | |
|---|---|---|
| Flexural Strength | 8900 psi | |
| Tensile Strength | 4200 psi | |
| Dissipation Factor - | As molded | 0.001 |
| | After 24 hours in water at 25° C. | 0.002 |

The molding resin produced was then used in the transfer molding of transistor housings. After molding, the transistor housings were subjected to a heat treatment of 200° C for 2 hours to completely remove any entrapped alcohol, water or entrapped gases. The transistors produced were of excellent uniform quality.

Example 3 was repeated except that one part of hydroquinone was substituted for the one part of diphenylsilanediol. The test specimens produced were very badly blistered and had many voids. The test specimens had the following properties:

| | | |
|---|---|---|
| Flexural Strength | 4200 psi | |
| Tensile Strength | 1800 psi | |
| Dissipation Factor - | As produced | 0.001 |
| | After 24 hours in water at 25° C. | 0.021 |

EXAMPLE 4

By the method described in U.S. Pat. application, Ser. No. 671,574 of Merrill, now abandoned, a resin was produced which contained on a molar basis 50 percent methylpolysiloxane units and 50 percent phenylpolysiloxane units. The resin was solid and contained 5 percent by weight of silicon-bonded hydroxy groups and 2 percent by weight of silicon-bonded isopropoxy groups. The ratio of methyl groups to silicon atoms was 0.5 as was the ratio of phenyl groups to silicon atoms.

A mixture was formulated containing 40 parts of the resin, 120 parts of 325 mesh fused silica, 1 part of calcium stearate, 0.2 part of lead carbonate, and 1 part of vinyltriethoxysilane. All of the above ingredients were blended together in a high speed blade mixer and were then milled on a two-roll mill at a temperature of 90° C for 5 minutes. The resulting molding compound was cooled to 25° C and granulated. The molding compound was then heated in a die for 3 minutes at 175° C and 800 psi to produce a 6 × 6 × 1/16 inch test specimen. The test specimen produced was rigid, unblistered and free of voids. The test specimen had the following properties:

| | | |
|---|---|---|
| Flexural Strength | 10,200 psi | |
| Tensile Strength | 5,600 psi | |
| Dissipation Factor - | Original | 0.001 |
| | After 24 hours in water at 25° C. | 0.002 |

The molding compound was used to make transistor housings in a transfer molding apparatus. After molding, the transistor housings were subjected to a heat treatment of 200° C for 2 hours to completely remove any entrapped alcohol, water and entrapped gases. The transistors produced were of uniformly good quality with excellent electrical properties.

The above-described example was repeated except that one part of propylene glycol was used to replace the vinyltriethoxysilane. The test specimens produced were very soft which indicated poor cure, were very badly blistered, and had the following physical properties:

| | |
|---|---|
| Flexural Strength | 4100 psi |
| Tensile Strength | 2400 psi |
| Dissipation Factor - Original | 0.001 |
| After 24 hours in water at 25° C. | 0.024 |

EXAMPLE 5

Into a hydrolyzer was charged 918 parts of isopropyl alcohol. Over a 2-hour period, 1,000 parts of methyltrichlorosilane was slowly added to the alcohol. The reaction temperature was maintained below 40° C by external cooling until escaping HCl started to cool the reaction. The temperature of the reaction dropped to 10° C toward the end of the silane addition. After all of the methyltrichlorosilane had been added, hydrogen chloride was removed from the reaction mixture by the application of vacuum, gradually, as the temperature was slowly increased to 100° C. After the hydrogen chloride had been stripped from the partially alkoxylated silane, the partially alkoxylated silane was cooled to 25° C. The silane was 75 percent alkoxylated, that is to say, 75 percent of the chlorine atoms in the silane were replaced by isopropoxy groups.

The partially alkoxylated silane was placed in a hydrolyzer, and 1,045 parts of toluene was added. A mixture of 200 parts of acetone and 200 parts of water was then added to the hydrolyzer over a 40-minute interval. The reaction temperature was controlled with external cooling to maximum temperature of 40° C. Immediately following the addition of the water-acetone mixture, 200 parts of additional hydrolysis water was added over a 5-minute period, cooling was discontinued and the product was agitated for 25 minutes. To the hydrolyzate was added 866 parts of wash water and the agitation was continued for 15 minutes. The water was then allowed to settle for 30 minutes and was drawn off as the lower layer. The hydrolyzate was then vacuum stripped at a temperature below 50° C to 70 percent solids. The hydrolyzate was then filtered through Fullers' earth. The hydrolyzate was then heated to 80° C and a partial vacuum was applied. The temperature was slowly increased to 150° C over a 30-minute period. The vacuum applied was also slowly increased over this period. The temperature was then held at 150° C for 30 additional minutes until all of the solvent was removed by vacuum stripping. After the solvent was stripped, a resin remained in the hydrolyzer in a molten stage. The resin was cooled to room temperature and ground to a 30 mesh particle size.

A molding compound was prepared by mixing 112 parts of 325 mesh fused silica filler, 1 part of zinc stearate, 36 parts of the above-described resin, 0.165 parts of $PbO_2$ and 3 parts of diphenylsilanediol. The mixture was milled at 80° C for 5 minutes in a high speed blade mixer. The molding compound was tested for flow and moldability on a Hull transfer press. The flow at 175° C and 800 psi was 41.5 inches and the molded part after a 3-minute cure cycle had no blisters or voids. The Rockwell hardness on the M scale was 75M indicating excellent cure. The molding resin was also used in the fabrication of transistor housings and the transistors produced were of uniform excellent quality.

What I claim as new and desire to secure by Letters Patent of the United States is:

1. A composition comprising (a) an uncured silicone resin containing at least 0.25 percent by weight of silicon-bonded groups selected from the class consisting of hydroxyl groups and lower alkoxy groups of the average unit formula, $$(OH)_q(OR^3)_rR^3_sSiO_{(4-q-r-s)/2}$$

where $R^3$ is selected from the class comprising lower alkyl radicals having one to eight carbon atoms; cycloalkyl radicals having five to seven carbon atoms in the ring; lower alkenyl radicals having two to eight carbon atoms; mononuclear aryl radicals; mononuclear aryl lower alkyl radicals having one to six carbon atoms in the alkyl group; and halogenated derivatives of the above radicals; $(OR^3)$ is a lower alkoxy radical containing from one to eight carbon atoms per radical; $q$ has a value of 0 to 1.0; $r$ has a value of 0 to 1.0; $s$ has a value of 1.0 to 1.7; and the sum of $q+r$ has a value of 0.01 to 1.0 and (b) a catalyst system comprising, 1. from 0.01 to 5 percent by weight based upon the total weight of (a) and (b) of a compound selected from the group consisting of $2PbCO_3 \cdot Pb(OH)_2$, $PbCO_3$, $Pb_2O_3$, $Pb_3O_4$ and $PbO_2$; and
2. from one-half to 10 percent by weight based upon the total weight of (a) + (b) of a compound, other than the resin, selected from the class consisting of
   i. a silane of the formula,
   $$R_t(OH)_u(OR)_vSi$$
   where R is selected from the class consisting of lower alkyl radicals having one to eight carbon atoms; cycloalkyl radicals having five to seven carbon atoms in the ring; lower alkenyl radicals having two to eight carbon atoms; mononuclear aryl radicals; mononuclear aryl lower alkyl radicals having one to six carbon atoms in the alkyl group; and halogenated derivatives of the above radicals; OR is a lower alkoxy radical containing from one to eight carbon atoms per radical; $t$ has a value of 1 to 3; $u$ has a value of 0 to 3, $v$ has a value of 0 to 3; and the sum of $u+v$ has a value of 1 to 3;
   ii. a siloxane compound having the average unit formula,
   $$R^2_x(HO)_y(OR)^2_zSiO_{(4-x-y-z)/2}$$
   where $R^2$ and $(OR)^2$ are defined as R and (OR), respectively are defined above; $x$ has a value of 1 to 3 and when $x$ has a value of less than 1.7, there are at least 5 percent by weight based upon the weight of the siloxane compound of HO and $(OR)^2$ groups in the siloxane compound; $y$ has a value of 0 to 2; $z$ has a value of 0 to 2, and the sum of $y+z$ has a value of 0.02 to 2, and (c) a filler.

2. The composition of claim 1, wherein (b) contains lead carbonate.

3. The composition of claim 1, wherein $q$ has a value of 0.2 to 0.55; $r$ has a value of 0.2 to 0.55; and $s$ has a value of 1.05 to 1.45.

4. The composition of claim 1, wherein the sum of $q+r$ has a value of 0.2 to 0.55.

5. The composition of claim 1, wherein the resin contains from 4 to 11 percent of silicon-bonded groups selected from the class consisting of hydroxyl groups and alkoxy groups.

6. The composition of claim 1, wherein the resin contains from 5 to 7 percent by weight of groups selected from the class consisting of hydroxy and lower alkoxy groups.

* * * * *